US009211768B2

(12) United States Patent
Inoue

(10) Patent No.: US 9,211,768 B2
(45) Date of Patent: Dec. 15, 2015

(54) PNEUMATIC TIRE

(71) Applicant: Sumitomo Rubber Industries, Ltd., Kobe-shi, Hyogo (JP)

(72) Inventor: Seiji Inoue, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 344 days.

(21) Appl. No.: 13/974,196

(22) Filed: Aug. 23, 2013

(65) Prior Publication Data

US 2014/0283967 A1  Sep. 25, 2014

(30) Foreign Application Priority Data

Mar. 22, 2013  (JP) .................................. 2013-060611

(51) Int. Cl.
  *B60C 11/12* (2006.01)
  *B60C 11/03* (2006.01)
  *B60C 11/04* (2006.01)

(52) U.S. Cl.
  CPC .............. *B60C 11/12* (2013.01); *B60C 11/0304* (2013.04); *B60C 11/0306* (2013.04); *B60C 11/1236* (2013.04); *B60C 11/0302* (2013.04); *B60C 2011/036* (2013.04); *B60C 2011/0353* (2013.04); *B60C 2011/0365* (2013.04);
  (Continued)

(58) Field of Classification Search
  CPC ............. B60C 11/0302; B60C 11/0304; B60C 11/1236; B60C 11/0306; B60C 2011/0386; B60C 2011/1286; B60C 2011/036; B60C 2011/0372; B60C 2011/0365; B60C 2011/0353

USPC ......................................... 152/209.18, DIG. 3
See application file for complete search history.

(56) References Cited

U.S. PATENT DOCUMENTS

| 5,012,847 A | * | 5/1991 | Fukumoto | ........... B60C 11/0306 |
| | | | | 152/209.18 |
| 2007/0284026 A1 | * | 12/2007 | Suzuki | ................ B60C 11/0306 |
| | | | | 152/209.18 |
| 2009/0090444 A1 | * | 4/2009 | Feider | ..................... B60C 11/04 |
| | | | | 152/209.8 |

FOREIGN PATENT DOCUMENTS

| GB | 2160829 A | * | 1/1986 | .......... B60C 11/0318 |
| JP | 60157903 A | * | 8/1985 | |

(Continued)

OTHER PUBLICATIONS

Machine Translation: JP 2744611 B2; no date.*

(Continued)

*Primary Examiner* — Richard Crispino
*Assistant Examiner* — Kendra Ly
(74) *Attorney, Agent, or Firm* — Birch Stewart Kolasch & Birch, LLP

(57) ABSTRACT

A pneumatic tire comprises a tread portion provided with an inboard shoulder main groove, an outboard shoulder groove, and a center main groove provided therebetween, to form an outboard shoulder portion, an inboard shoulder portion, an inboard middle portion, and an outboard middle portion, the inboard and outboard middle portions being formed as ribs respectively, that are provided with only sipes having widths less than 2.0 mm, wherein the sipes provided on the inboard middle portion include a full-opened sipe, the sipes provided on the outboard middle portion consisting of outer semi-opened sipes and inner semi-opened sipes, wherein the number of the inner semi-opened sipes is smaller than the number of the outer semi-opened sipes.

10 Claims, 10 Drawing Sheets

(52) U.S. Cl.
CPC . *B60C2011/0372* (2013.04); *B60C 2011/1254* (2013.04)

(56) References Cited

FOREIGN PATENT DOCUMENTS

| JP | 02068205 | A | * | 3/1990 |
| JP | 2744611 | B2 | * | 4/1998 |
| JP | 2004-90752 | A | | 3/2004 |
| JP | 2012254654 | A | * | 12/2012 |

OTHER PUBLICATIONS

Machine Translation: JP 2012254654 A; Takahashi, Junichi; no date.*

* cited by examiner

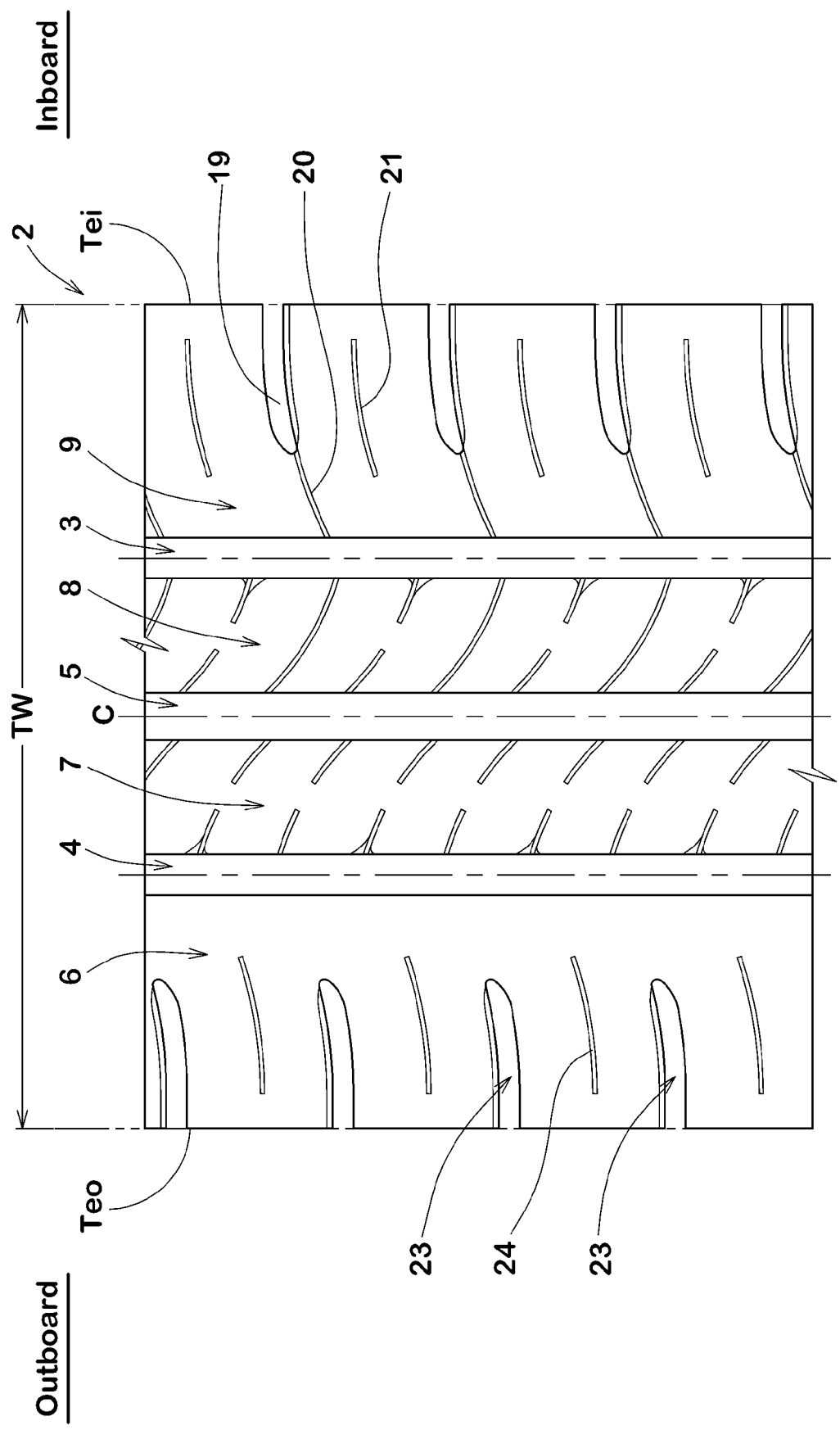

PNEUMATIC TIRE

BACKGROUND OF THE INVENTION

1. Field of the Invention

The present invention relates to a pneumatic tire having improved steering stability and ride comfort.

2. Description of the Related Art

In order to improve steering stability of a vehicle having tires, the tires should offer improved initial responsiveness and steering effort, when cornering.

Initial responsiveness when cornering means an amount of time period until the vehicle reaches in steady turning from when a driver starts steering. As for initial responsiveness, the time period mentioned above is concerned; the shorter, the better. In order to improve initial responsiveness of tires when cornering, side force from tires should be generated as soon as possible from when steering has started.

On the other hand, steering effort means an amount of driver input or muscle it takes to turn or steer wheels. In order to maintain stability of a tire during cornering, steering effort is concerned to have a moderate weight. In order to suitably increase steering effort, sufficient pattern rigidity should be offered on the tread portion of the tire that comes into contact with the road when straight traveling ahead.

However, the tire having an improved tread portion with high pattern rigidity tends to deteriorate not only braking performance on wet roads, but also ride comfort.

SUMMARY OF THE INVENTION

The present invention has been worked out in light of the circumstances described above, and has a main object of providing a pneumatic tire in which steering stability and ride comfort may be improved.

In accordance with the present invention, there is provided a pneumatic tire comprising a tread portion having a designated install direction to a vehicle to define an inboard tread edge and an outboard tread edge, the tread portion provided with a plurality of circumferentially and continuously extending main grooves, said main grooves comprising an inboard shoulder main groove, an outboard shoulder groove, and a center main groove provided therebetween, to form an outboard shoulder portion disposed axially outside the outboard shoulder main groove, an inboard shoulder portion disposed axially outside the inboard shoulder main groove, an inboard middle portion between the center main groove and the inboard shoulder main groove, and an outboard middle portion between the center main groove and the outboard shoulder main groove, said inboard middle portion and outboard middle portion forming ribs respectively that are provided with only sipes having widths in a range of less than 2.0 mm, said sipes provided on the inboard middle portion including a full-opened sipe that has one end connected with the inboard shoulder main groove and the other end connected with the center main groove, said sipes provided on the outboard middle portion consisting of a plurality of outer semi-opened sipes and a plurality of inner semi-opened sipes, each said outer semi-opened sipe having one end connected with the outboard shoulder main groove and the other end terminating within the outboard middle portion, and each said inner semi-opened sipe having one end connected with the center main groove and the other end terminating within the outboard middle portion, wherein the number of said inner semi-opened sipes is smaller than the number of said outer semi-opened sipes.

Preferably, said outer semi-opened sipes comprise a plurality of first outer semi-opened sipes and a plurality of second outer semi-opened sipes, wherein each first outer semi-opened sipe is provided on an extension line of one of said inner semi-opened sipes, and each second outer semi-opened sipe is provided between adjacent said first outer semi-opened sipes.

Preferably, said sipes provided on said inboard middle portion further include a plurality of outer semi-opened sipes each having one end connected with the inboard shoulder main groove and the other end terminating within the inboard middle portion and a plurality of inner semi-opened sipes each having one end connected with the center main groove and the other end terminating within the inboard middle portion, Preferably, said outer semi-opened sipes on said inboard middle portion consist of first outer semi-opened sipes each of which is provided on an extension line of said each inner semi-opened sipe on the inboard middle portion.

Preferably, each said full-opened sipe is provided between adjacent first outer semi-opened sipes.

Preferably, each said full-opened sipe is provided in a center region between adjacent first outer semi-opened sipes.

Preferably, said each sipe on the inboard middle portion extends in arc-shape having its center of radius located in a first side of the sipe with respect to a circumferential direction of the tire, and said each sipe on the outboard middle portion extends in arc-shape having its center of radius located in a second side of the sipe with respect to the circumferential direction of the tire, wherein the second side is opposite to the first side.

Preferably, said outboard shoulder portion is provided with a plurality of outboard shoulder lug grooves having groove widths in a range of not less than 2 mm, wherein each outboard shoulder lug groove extends from the outboard tread edge to its axially inner end terminating within the outboard shoulder portion.

Preferably, said inboard shoulder portion is provided with a plurality of inboard shoulder lug grooves having groove widths in a range of not less than 2 mm, and a plurality of inboard shoulder sipes, wherein each inboard shoulder lug groove extends from the inboard tread edge to its axially inner end terminating within the inboard shoulder portion, and said inboard shoulder sipes comprises a plurality of inner shoulder sipes each extending between the axially inner end of the inboard shoulder lug groove and the inboard shoulder main groove.

Preferably, each said outboard shoulder lug groove comprises an axially outer portion extending along an axial direction of the tire and an axially inner portion inclining with respect to the axial direction of the tire.

Preferably, each said inboard shoulder lug groove comprises an axially outer portion extending along an axial direction of the tire and an axially inner portion inclining with respect to the axial direction of the tire.

Preferably, said inboard shoulder sipe is inclined in the same direction of the axially inner portion of the inboard shoulder lug groove.

BRIEF DESCRIPTION OF THE DRAWINGS

FIG. 5 is a development view showing a tread portion of a reference.

DETAILED DESCRIPTION

Figure 1:
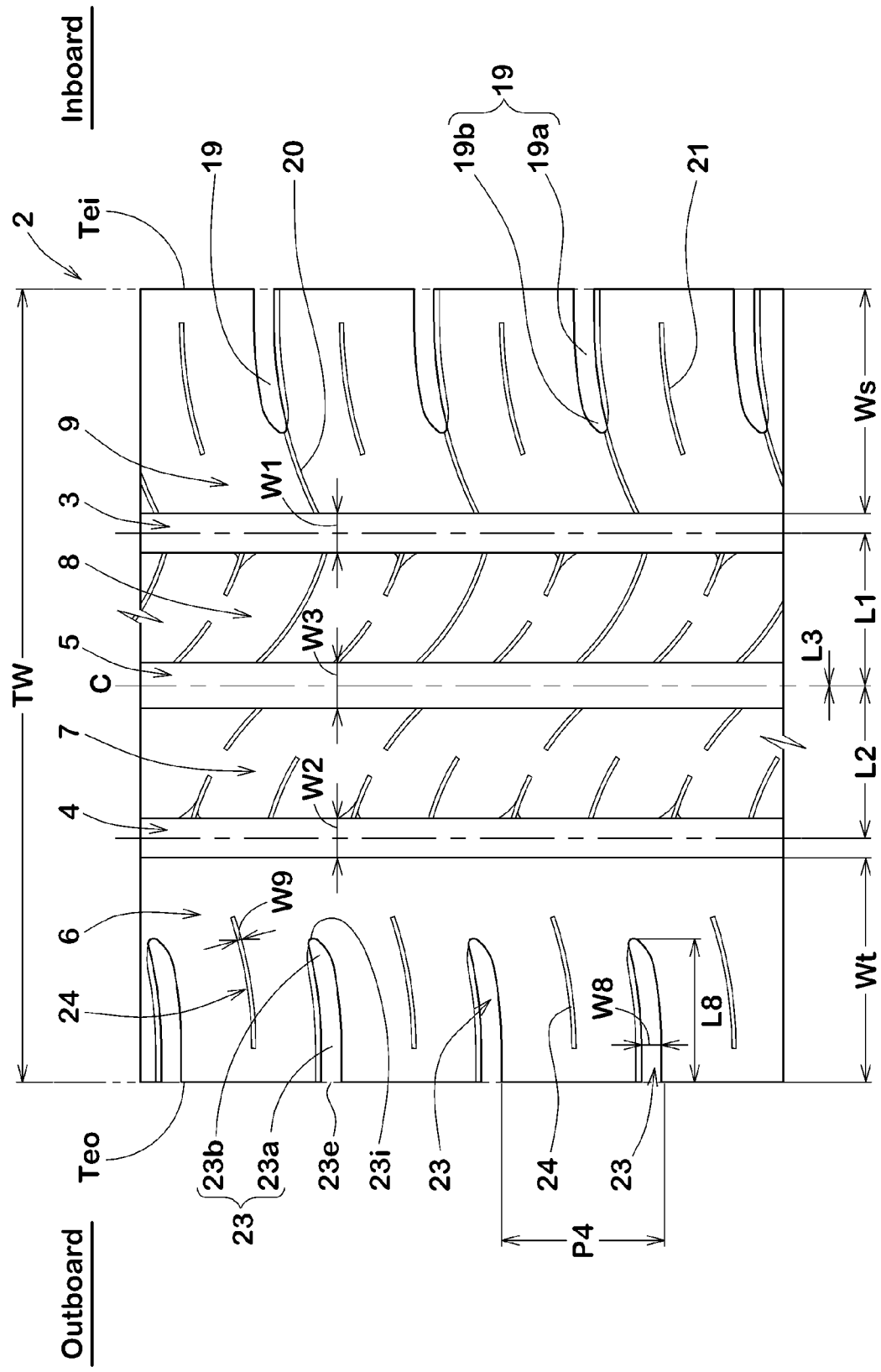
FIG. 1 is a development view of a tread portion of a pneumatic tire showing an embodiment of the present invention.

An embodiment of the present invention will be explained below with reference to the accompanying drawings. Before the present invention is described in detail, it should be noted that like elements are denoted by the same reference numerals throughout the disclosure.

Referring to FIG. 1, a pneumatic tire (hereinafter it may simply be referred as "the tire") 1 in accordance with the present invention, which is suitably used for a passenger car, has a tread portion 2 having an asymmetrical pattern with a designated install direction to a vehicle for defining an inboard tread edge (Tei) and an outboard tread edge (Teo). The designated direction is identified using characters or a mark on its sidewall portion (not shown), for example.

The inboard tread edge (Tei) refers to one of the two tread edges which is intended to be positioned towards the center of the vehicle body. The outboard tread edge (Teo) refers to the other tread edge which is intended to be positioned away from the center of the vehicle body. According thereto, in this application, the terms "outboard" and "inboard" are used toward the outboard tread edge (Teo) and inboard tread edge (Tei), respectively, to refer relative positions in the tire axial direction. The terms "axially inner", "axially inward" and the like are used toward the tire equator, and the terms "axially outer", "axially outward" and the like are used toward the tread edge in order to refer relative positions in the tire axial direction.

Here, tread edges are the axial outermost edges of the ground contacting patch of the tread portion 2 which occurs under a normally inflated loaded condition when the camber angle of the tire is zero. The normally inflated loaded condition is such that the tire is mounted on a standard wheel rim and inflated to a standard pressure and loaded with a standard tire load.

The tread width TW is defined as the width measured under the normally inflated unloaded condition, as the axial distance between the inboard and outboard tread edges Tei, Teo determined as above. The normally inflated unloaded condition is such that the tire is mounted on the standard wheel rim and is inflated to the standard pressure but loaded with no tire load.

In this application including specification and claims, various dimensions, positions and the like of the tire refer to those under the normally inflated unloaded condition of the tire unless otherwise noted.

The standard wheel rim is a wheel rim officially approved or recommended for the tire by standards organizations, i.e. JATMA, TRA, ETRTO, and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list.

The standard pressure is the "maximum air pressure" in JATMA, the "Inflation Pressure" in ETRTO, and the maximum pressure given in the "Tire Load Limits at various Cold Inflation Pressures" table in TRA or the like.

The standard load is the "maximum load capacity" in JATMA, the "Load capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

The tread portion 2 is provided with a plurality of circumferentially and continuously extending main grooves that comprise an inboard shoulder main groove 3, an outboard shoulder groove 4, and a center main groove 5 provided therebetween. Thus, the tread portion 2 is formed a plurality of land portions that include an outboard shoulder portion 6 disposed between the outboard shoulder main groove 4 and the outboard tread edge Teo, an outboard middle portion 7 between the center main groove 5 and the outboard shoulder main groove 4, an inboard middle portion 8 between the center main groove 5 and the inboard shoulder main groove 3, and an inboard shoulder portion 9 between the inboard shoulder main groove 3 and the inboard tread edge Tei.

Each of main grooves 3, 4, 5 in accordance with the present embodiment straightly extends in the circumferential direction of the tire to effectively drain the water from under the tread backwardly while enhancing circumferential rigidity of each land portion. Accordingly, steering stability and braking performance on wet roads may be improved.

In order to further improve steering stability and braking performance on wet roads, groove widths w1 to w3 of main grooves 3 to 5, for example, are preferably in a range of from 2% to 10% of the tread width TW, and groove depths of main grooves 3 to 5, for example, are preferably in a range of from 4.0 to 8.5 mm.

In order to maintain lateral rigidity of land portions 6 to 9, an axial distance L1 between a centerline of the inboard shoulder main groove 3 and the tire equator C is preferably in a range of from 15% to 30% of the tread width TW. An axial distance L2 between a centerline of the outboard shoulder main groove 4 and the tire equator C is preferably in a range of from 15% to 30% of the tread width TW. An axial distance L3 between a centerline of the center main groove 5 and the tire equator C is preferably in a range of not more than 5% of the tread width TW.

Figure 2:
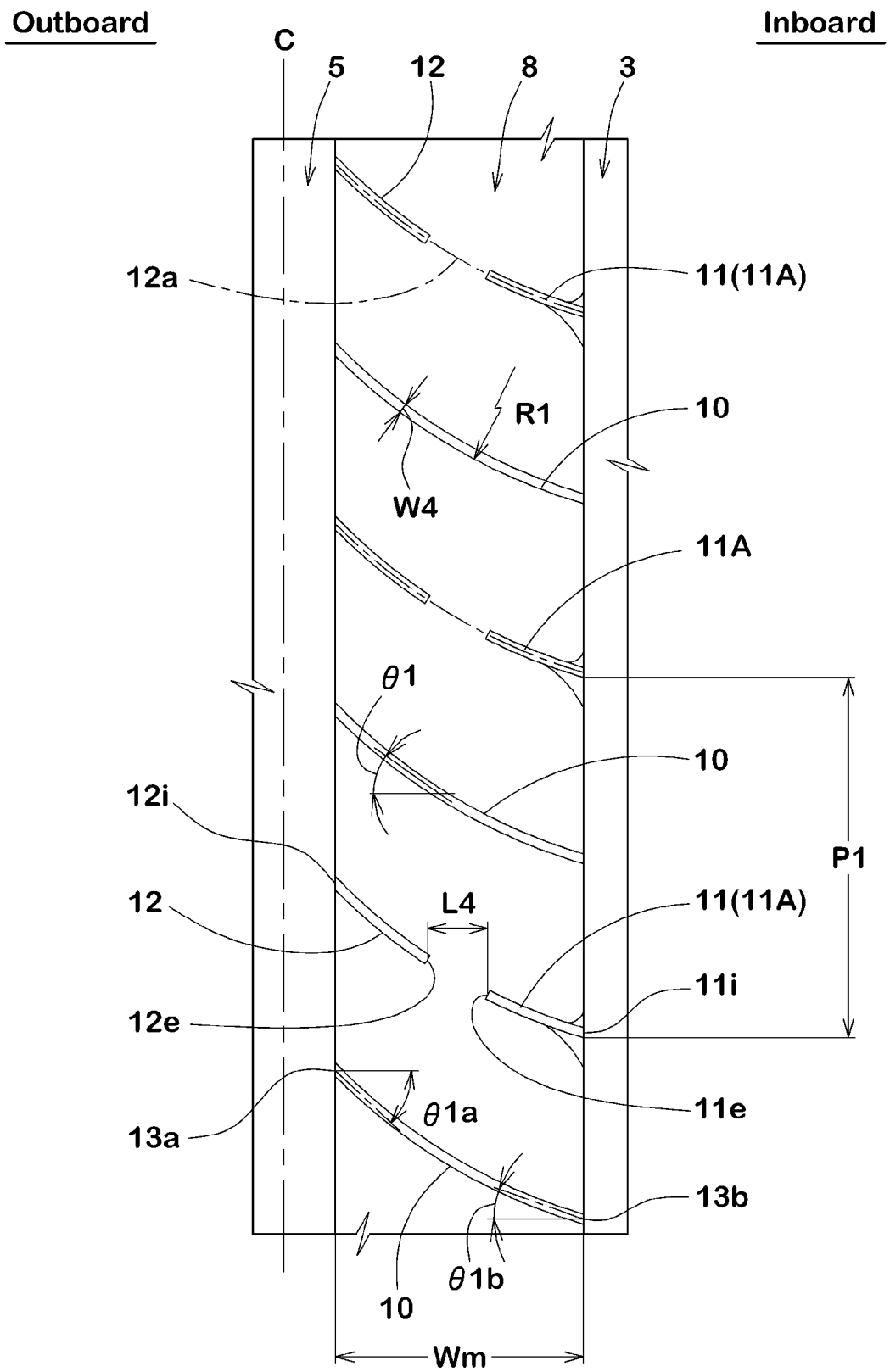
FIG. 2 is an enlarged view of an inboard middle portion of FIG. 1.

FIG. 2 shows an enlarged view of the inboard middle portion 8 of FIG. 1. Referring to FIG. 2, the inboard middle portion 8 is provided with only sipes so as to form a rib having high pattern rigidity. The inboard middle portion 8 mainly comes into contact with a road during straight traveling ahead.

The sipe mentioned above is defined as a thin slit or the like having a width in a range of less than 2 mm. The groove is defined as a groove having a width in a range of not less than 2 mm.

Sipes provided on the inboard middle portion 8 include a plurality of full-opened sipes 10 each of which has one end 13b connected with the inboard shoulder main groove 3 and the other end 13a connected to the center main groove 5, a plurality of outer semi-opened sipes 11 each of which has one end 11i connected with the inboard shoulder main groove 3 and the other end 11e terminating within the inboard middle portion 8, and a plurality of inner semi-opened sipes 12 each of which has one end 12i connected with the center main groove 5 and the other end 12e terminating within the inboard middle portion 8. The outer and inner semi-opened sipes 11, 12 help to maintain pattern rigidity of the inboard middle portion 8.

The other end 11e of the outer semi-opened sipes 11 is located axially outward than the other end 12e of the inboard semi-opened sipes 12 to maintain pattern rigidity of the inboard middle portion 8. In this embodiment, outer semi-opened sipes 11 consist of first outer semi-opened sipes 11A each of which is provided on an extension line 12a of one of the inner semi-opened sipes 12. The extension line 12a of the inner semi-opened sipe 12 is defined as a single arc that passes three points including both ends and a center on a centerline of the inner semi-opened sipes 12. Here, the first outer semi-opened sipes 114 is defined as a sipe in which at least a part of it passes on the extension line 12a.

In order to maintain ride comfort, an axial length L4 between the other end 11e of the outer semi-opened sipes 11 and the other end 12e of the inner semi-opened sipes 12 is preferably in a range of from 0.20 to 0.30 times of an axial width Wm of the inboard middle portion 8.

In this embodiment, one full-opened sipe 10 is provided between adjacent two first outer semi-opened sipes 11A, 11A in the circumferential direction of the tire. Preferably, each full-opened sipe 10 is provided in a center region between adjacent first outer semi-opened sipes 11A, 11A. Here, the center region above is a 20% region of the pitch P1 of first outer semi-opened sipes 11A, wherein the 20% region has a center corresponding to the center of the pitch P1.

The full-opened sipes 10, outer semi-opened sipes 11 and inner semi-opened sipes 12 are curved in an arc manner, respectively. Since these sipes effectively disperse multidirectional tire load so as to prevent deformation of the inboard middle portion 8, steering stability may be improved.

Each sipe 10 to 12 has its center of radius located in a first side of each sipe with respect to a circumferential direction of the tire. The first side in this embodiment corresponds to upside in FIG. 2. Thus, each sipe 10 to 12 protrudes the same direction such that rigidity of the inboard middle portion 8 is maintained in well balanced.

In order to maintain pattern rigidity of inboard middle portion 8, the radius of curvature R1 of each sipe 10 to 12 is preferably in a range of from 30 to 100 mm, more preferably in a range of from 40 to 80 mm. Preferably, each sipe 10 to 12 has the same radius of curvature R1 to further improve rigidity of inboard middle portion 8.

Each sipe 10 to 12 has an angle $\theta 1$ with respect to the axial direction of the tire, that is decreasing toward axially outwardly of the tire. Thus, lateral rigidity of the axially outer inboard middle portion 8 may be enhanced. Additionally, circumferential rigidity of the axially inner inboard middle portion 8 may be enhanced.

In order to further improve the advantage above, each sipe 10 to 12 preferably has the angle $\theta 1a$ in a range of from 30 to 60 degrees with respect to the axial direction of the tire at the junction of the center main groove 5. Similarly, each sipe 10 to 12 preferably has the angle $\theta 1b$ in a range of from 5 to 25 degrees with respect to the axial direction of the tire at the junction of the inboard middle main groove 3.

In this embodiment, sipes 10 to 12 are arranged in parallel each other to maintain rigidity of inboard middle portion 8.

Preferably, each sipe 10 to 12 provided on the inboard middle portion 8 has a width w4 in a range of from 0.2 to 1.5 mm. Preferably, each sipe 10 to 12 provided on the inboard middle portion 8 has a depth in a range of from 25% to 90% in respect to the depth of center main groove 5.

Figure 3:
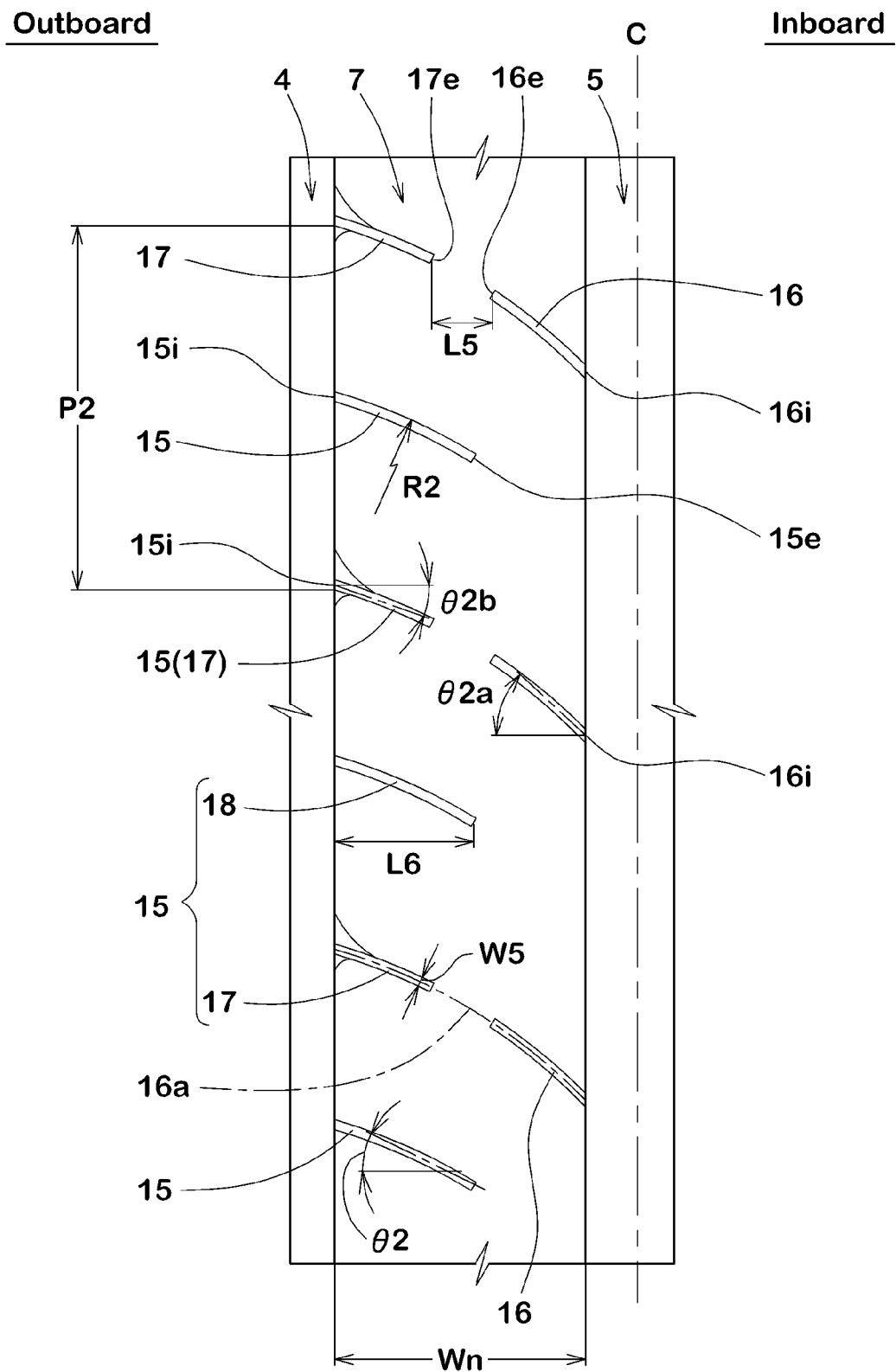
FIG. 3 is an enlarged view of an outboard middle portion of FIG. 1.

FIG. 3 shows an enlarged view of the outboard middle portion 7 of FIG. 1. Referring to FIG. 3, the outboard middle portion 7 is provided with only sipes so as to form a rib having high pattern rigidity. The outboard middle portion 7 mainly comes into contact with a road during straight traveling ahead.

The outboard middle portion 7 is provided with only sipes consisting of a plurality of outer semi-opened sipes 15 and a plurality of inner semi-opened sipes 16. Each outer semi-opened sipe 15 has one end 15i connected with the outboard shoulder main groove 4 and the other end 15e terminating within the outboard middle portion 7. Each inner semi-opened sipe 16 has one end 16i connected with the center main groove 5 and the other end 16e terminating within the outboard middle portion 7. In this embodiment, since the outboard middle portion 7 has rigidity relatively larger than that of the inboard middle portion 8, initial responsiveness of the tire when cornering may be improved by smoothly shifting tread contact patch toward outboard of the tire.

In the outboard middle portion 7, the number of inner semi-opened sipes 16 is smaller than the number of semi-opened outer sipes 15. Thus, since the outer middle portion 7 may have its axially inner rigidity larger than its axially outer rigidity, the tire 1 offers satisfactory steering effort to a driver.

In this embodiment, outer semi-opened sipes 15 consist of a plurality of first outer semi-opened sipes 17 and a plurality of second outer semi-opened sipes 18. The first semi-opened sipe 17 and the second semi-opened sipe 18 are alternately arranged in the circumferential direction of the tire.

The first outer semi-opened sipe 17 is provided on an extension line 16a of one of the inner semi-opened sipes 16. The other end 17e of the first outer semi-opened sipe 17 is positioned axially outward than the other end 16e of the inner semi-opened sipe 16 to maintain rigidity of the outboard middle portion 7. The extension line 16a of the inner semi-opened sipe 16 is defined as the same manner with the extension 12a of the inner semi-opened sipe 12 as mentioned above.

In order to maintain ride comfort, an axial length L5 between the other end 17e of the outer semi-opened sipes 17 and the other end 16e of the inner semi-opened sipes 16 is preferably in a range of from 0.20 to 0.30 times in respect to an axial width Wn of the outboard middle portion 7.

In order to effectively improve steering stability, ride comfort and noise performance by offering improved pattern rigidity of the outboard middle portion 7, the axial length L6 of the second outer semi-opened sipe 18 is preferably in a range of from 0.40 to 0.60 times in respect to the axial width Wn of the outboard middle portion 7.

In this embodiment, one second outer semi-opened sipe 18 is provided in a center region between adjacent first outer semi-opened sipes 17, 17 to maintain pattern rigidity of the outboard middle portion 7. Here, the center region above is a 20% region of the pitch P2 of first outer semi-opened sipes 17, wherein the 20% region has a center corresponding to the center of the pitch P2.

In this embodiment, the first outer semi-opened sipes 17 and the second outer semi-opened sipe 18 are arranged in parallel each other to maintain rigidity of outboard middle portion 7.

The outer semi-opened sipes 15 and inner semi-opened sipes 16 are curved in an arc manner, respectively. These sipes effectively disperse multidirectional tire load so as to prevent deformation of the outboard middle portion 7.

Each sipe 15, 16 has its center of radius located in a second side of each sipe with respect to a circumferential direction of the tire. The second side in this embodiment corresponds to downside in FIG. 2. Namely, the second side is opposite to the first side mentioned above. Thus, each sipe 15, protrudes the same direction such that rigidity of the outboard middle portion 7 is maintained in well balanced.

In order to maintain pattern rigidity of outboard middle portion 7, the radius of curvature R2 of each sipe 15, 16 is preferably in a range of from 30 to 100 mm, more preferably in a range of from 40 to 80 mm.

Each sipe 15, 16 has an angle $\theta 2$ with respect to the axial direction of the tire, which is decreasing toward outboard tread edge. Thus, lateral rigidity of the axially outer outboard middle portion 7 may be enhanced. Additionally, circumferential rigidity of the axially inner outboard middle portion 8 may be enhanced.

In order to further improve the advantage above, each sipe 15, 16 preferably has the angle $\theta 2a$ in a range of from 30 to 60 degrees with respect to the axial direction of the tire at the junction of the center main groove 5. Similarly, each sipe 15, 16 preferably has the angle $\theta 2b$ in a range of from 5 to 25 degrees with respect to the axial direction of the tire at the junction of the outboard middle main groove 4.

Preferably, each sipe 15, 16 provided on the outboard middle portion 7 has a width w5 in a range of from 0.2 to 1.5 mm. Preferably, each sipe 15, 16 provided on the outboard middle portion 7 has a depth in a range of from 25% to 90% in respect to the depth of center main groove 5.

Figure 4:
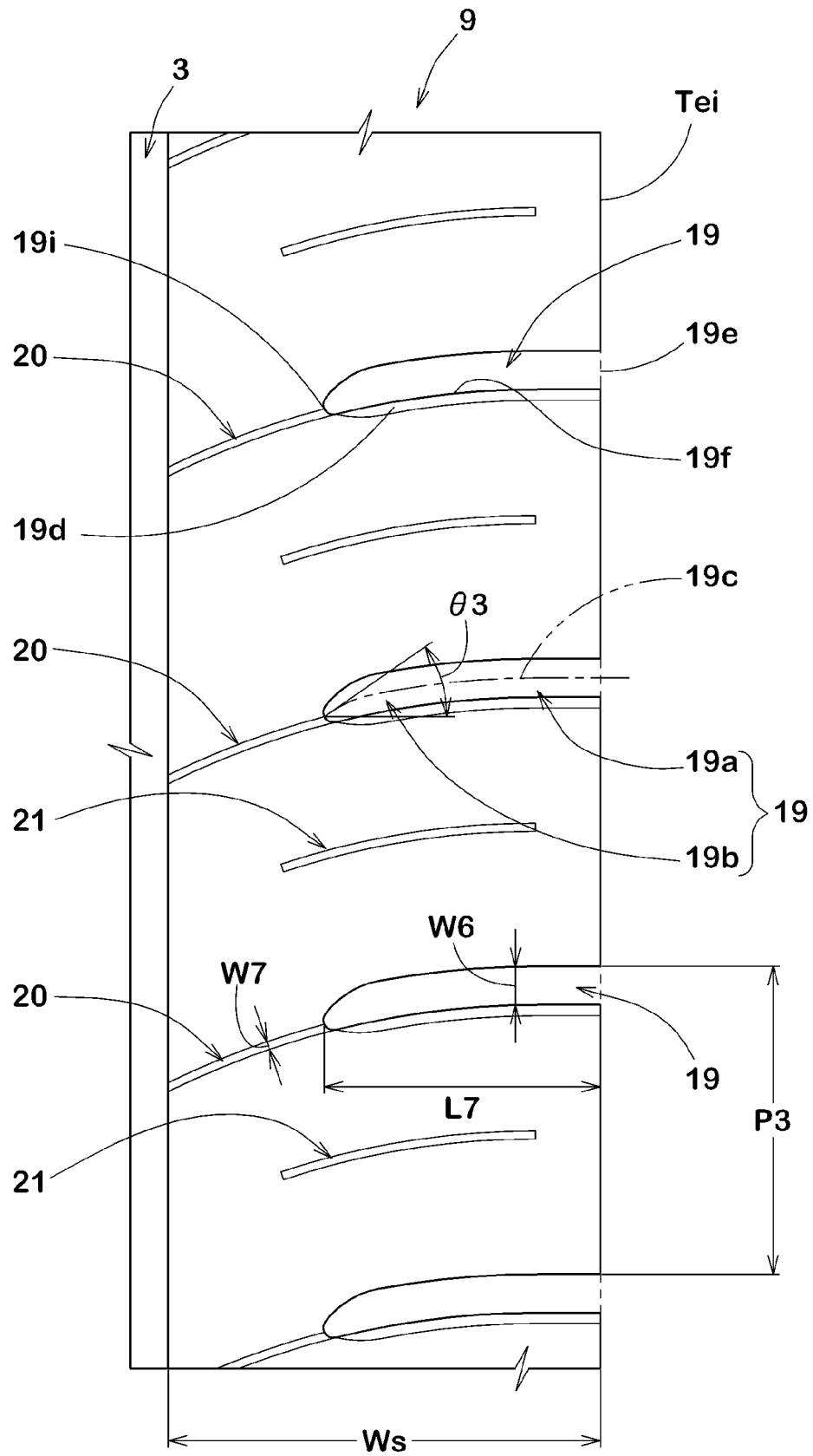
FIG. 4 is an enlarged view of an inboard shoulder portion of FIG. 1.

FIG. 4 shows an enlarged view of the inboard shoulder portion 9. Referring to FIG. 4, the inboard shoulder portion 9 is provided with a plurality of inboard shoulder lug grooves 19 and a plurality of inboard shoulder sipes 20, 21. Thus, the inboard shoulder portion 9 also forms a rib having high pattern rigidity.

Each inboard shoulder lug groove 19 extends from the inboard tread edge Tei to its axially inner end 19i terminating within the inboard shoulder portion 9. Such an inboard shoulder lug groove 19 may improve braking performance on wet roads.

A chamfer portion 19d is formed on at least one corner between the groove wall of the inboard shoulder lug groove 19 and the contact surface of the inboard shoulder portion 9. The chamfer portion 19d is connected with the upper edge 19f of the groove wall.

Each inboard shoulder lug groove 19 comprises an axially outer portion 19a extending along the axial direction of the tire and an axially inner portion 19b inclining with respect to the axial direction of the tire to drain the water from under the inboard shoulder portion 9 to the inboard tread edge (Tei) by utilizing lateral force during cornering. Additionally, the axially inner portion 19b may drain the water from under the inboard shoulder portion 9 to the inboard tread edge (Tei) by utilizing tire rotation during straight traveling ahead. Thus, the tire 1 may improve braking performance on wet roads.

In this embodiment, the axially outer portion 19a and the axially inner portion 19b are smoothly connected each other to maintain rigidity of the inboard shoulder portion 9.

In order to maintain rigidity of the inboard shoulder portion 9, the axially inner portion 19b Preferably has an angle $\theta 3$ in a range of more than 0 degree, but not more than 40 degrees in respect to the axial direction of the tire. The angle $\theta 3$ of the axially inner portion 19b is measured on its groove centerline 19c being a locus or path of a center point of the circumferential length of the axially inner portion 19b.

Sipe on the inboard shoulder portion 9 comprises a plurality of inner shoulder sipe 20 extending between the axially inner end 19i of the inboard shoulder lug groove 19 and the inboard shoulder main groove 3, and a plurality of closed sipes 21 having both ends terminating within the inboard shoulder portion 9.

Each inner shoulder sipe 20 is inclined the same direction with the axially inner portion 19b to maintain rigidity of the inboard shoulder portion 9. In this embodiment, the inner shoulder sipe 20 has one edge that is smoothly connected with the upper edge 19f of the inboard shoulder lug groove 19.

Each closed sipe 21 is provided between adjacent two inboard shoulder lug grooves 19, 19. The closed sipes 21 offer flexibility on the inboard shoulder portion 9 so that ride comfort is improved without deteriorating steering stability.

In order to maintain a proper balance between steering stability and ride comfort, the inboard shoulder lug groove 19 preferably has a groove width w6 measured along the circumferential direction of the tire in a range of from 5% to 20% in respect to a pitch P3 of inboard shoulder lug grooves 19. The sipes 20, 21 on the inboard shoulder portion 9 preferably have widths w7 in a range of from 0.2 to 1.5 mm. Similarly, the inboard shoulder lug grooves 19 preferably have depths (not shown) in a range of from 4.0 to 8.5 mm. The sipes 20, 21 on the inboard shoulder portion 9 preferably have depths (not shown) in a range of from 25% to 90% in respect to the depth of the inboard shoulder main groove 3. Additionally, the inboard shoulder lug grooves 19 preferably have axial lengths L7 in a range of from 50% to 80% in respect to the axial width Ws of the inboard shoulder portion 9.

Referring to FIG. 1, the outboard shoulder portion 6 is provided with a plurality of outboard shoulder lug grooves 23 extending from the outboard tread edge Teo to its axially inner end 23i terminating within the outboard shoulder portion 6, and a plurality of closed sipes 24 each having both ends terminating within the outboard shoulder portion 6. The outboard shoulder portion 6 has no any other grooves or sipes, which extend between the outboard shoulder main groove 4 and the outboard shoulder lug grooves 23. Thus, the outboard shoulder portion 6 may have pattern rigidity larger than that of the inboard shoulder portion 9, whereby initial responsiveness at cornering may further be improved.

In this embodiment, the outboard shoulder lug groove 23 comprises an axially outer portion 23a extending along the axial direction of the tire and an axially inner portion 23b inclined at an angle in respect to the axial direction of the tire.

Each closed sipe 24 is provided between adjacent two outboard shoulder lug grooves 23, 23.

In order to maintain a proper balance between steering stability and ride comfort, the outboard shoulder portion 6 has the pattern designed symmetrically with the inboard shoulder portion 9 around a point on the tire equator C except for the inner shoulder sipe 20.

The outboard shoulder lug grooves 19 preferably have groove widths w8 measured along the circumferential direction of the tire in a range of in a range of from not less than 2 mm, preferably in a range of from 5% to 20% in respect to a pitch P4 of outboard shoulder lug grooves 23. The closed sipes 24 preferably have widths w9 in a range of from 0.2 to 1.5 mm. Similarly, the outboard shoulder lug grooves 23 preferably have depths (not shown) in a range of from 4.0 to 8.5 mm. The closed sipes 24 preferably have depths (not shown) in a range of from 25% to 90% in respect to the depth of the outboard shoulder main groove 4. Additionally, the outboard shoulder lug grooves 23 preferably have axial lengths L8 in a range of from 50% to 80% in respect to the axial width wt of the outboard shoulder portion 9.

The present invention is more specifically described and explained by means of the following Examples and References. It is to be understood that the present invention is not limited to these Examples and embodiments described above.

Comparison Test

Pneumatic tires having a size of 175/65R14 with the basic tread pattern of FIG. 1 except for details shown in Table 1 were made and tested. Major common specifications and test method are as follows.

Major Common Specifications:
  Tread width TW: 123 mm
  Center main groove depth: 7.5 mm
  Inboard and outboard shoulder main groove depths: 7.5 mm Rim size: 14×5.0 J
Internal pressure (front): 230 kPa
Internal pressure (rear): 200 kPa
Tire load: 9.0 KN Wet Braking Performance Test:

The test vehicle above was driven on an asphalt road with a wet surface having a 5 mm depth of water and was suddenly braked at a speed of 100 km/hr. The braking distance of each tire was measured. The results are shown as a reciprocal number of the braking distance using an index based on Ex.1 being 100. The larger the value, the better the braking performance is.

Running Noise Test:

According to the actual-car-coasting-test specified in JASO/C/606, the test vehicle above was coasted for 50 meter distance on an asphalt road surface of a straight test course at a speed of 80 km/h. Then, the maximum level in dB(A) of the pass-by noise was measured with a microphone of sound level meter NL-15 produced by RION Co., LTD., that is fixed at a position 7.5 meter sideways from the running course center line and 1.2 meter from the road surface in the middle of the course. The smaller the value, the better the performance is.

TABLE 1

|  | Ex. 1 | Ex. 2 | Ref. 1 | Ex. 3 | Ref. 2 | Ref. 3 | Ex. 4 | Ex. 5 | Ex. 6 | Ex. 7 |
|---|---|---|---|---|---|---|---|---|---|---|
| Tread pattern | FIG. 1 | FIG. 1 | FIG. 1 | FIG. 1 | FIG. 1 | FIG. 5 | FIG. 1 | FIG. 1 | FIG. 1 | FIG. 1 |
| Inboard middle sipe width W4 (mm) | 0.6 | 1.9 | 2.2 | 0.6 | 0.6 | 0.6 | 0.6 | 0.6 | 0.6 | 0.6 |
| Outboard middle sipe width W5 (mm) | 0.6 | 0.6 | 0.6 | 1.9 | 2.2 | 0.6 | 0.6 | 0.6 | 0.6 | 0.6 |
| Ratio of number of inner sipe to number of outer sipe on outboard middle portion | 0.5 | 0.5 | 0.5 | 0.5 | 0.5 | 1 | 0.5 | 0.5 | 0.5 | 0.5 |
| Middle sipe radius of curvature R1, R2 (mm) | 43 | 43 | 43 | 43 | 43 | 43 | 25 | 30 | 100 | 120 |
| Steering stability [Score] | 100 | 85 | 75 | 90 | 80 | 92 | 96 | 98 | 98 | 96 |
| Ride comfort [Score] | 100 | 105 | 108 | 103 | 105 | 101 | 100 | 100 | 100 | 100 |
| Wet braking performance [Index] | 100 | 105 | 108 | 103 | 105 | 100 | 100 | 100 | 100 | 100 |
| Noise performance [db (A)] | 74.1 | 74.1 | 74 | 74.1 | 74 | 74.1 | 74.1 | 74.2 | 74 | 74.1 |

Figure 6A:
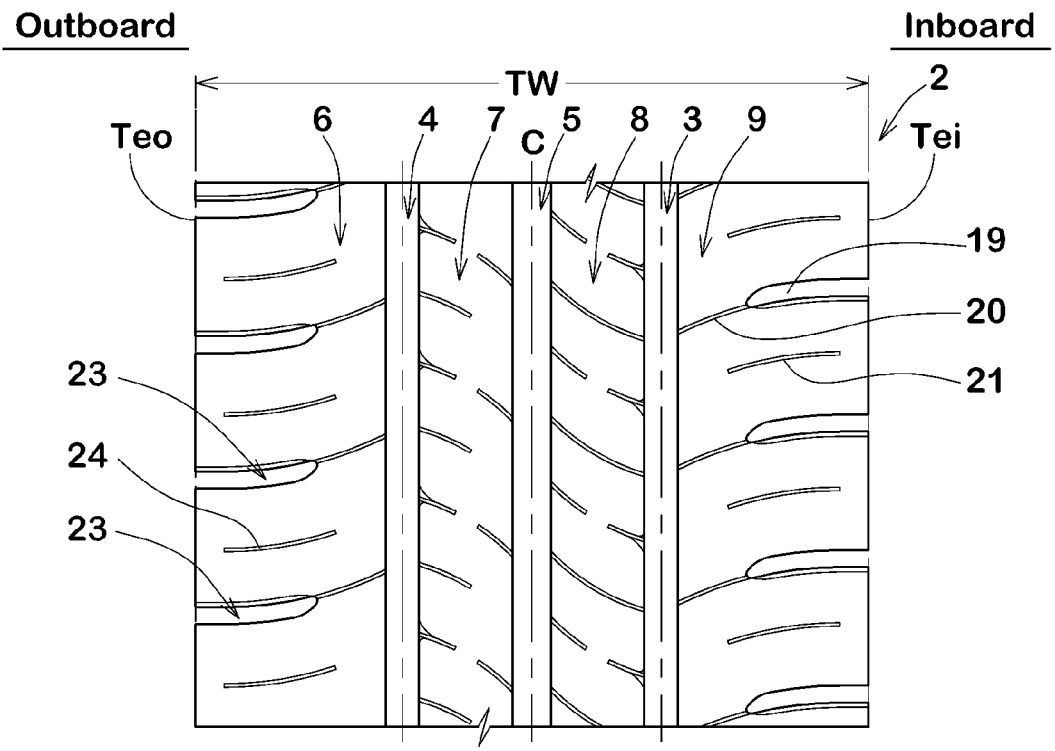
FIG. 6A is a development view of a tread portion in accordance with another embodiment of the present invention.
Figure 6B:
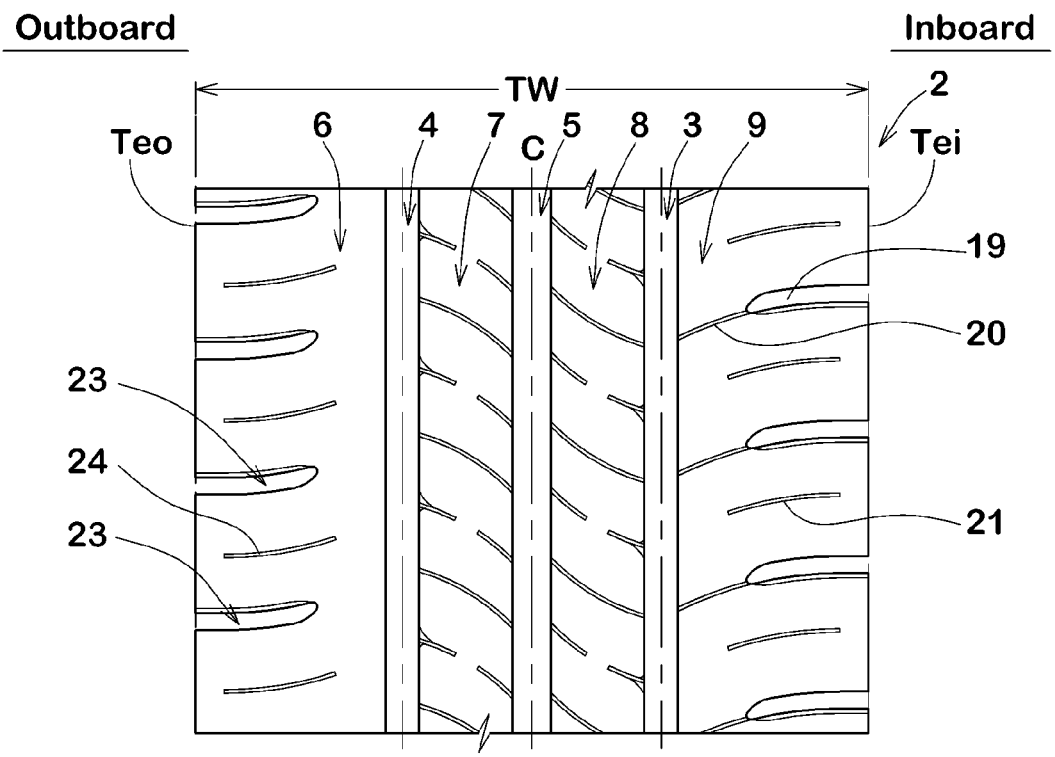
FIG. 6B is a development view of a tread portion in accordance with another reference.
Figure 7A:
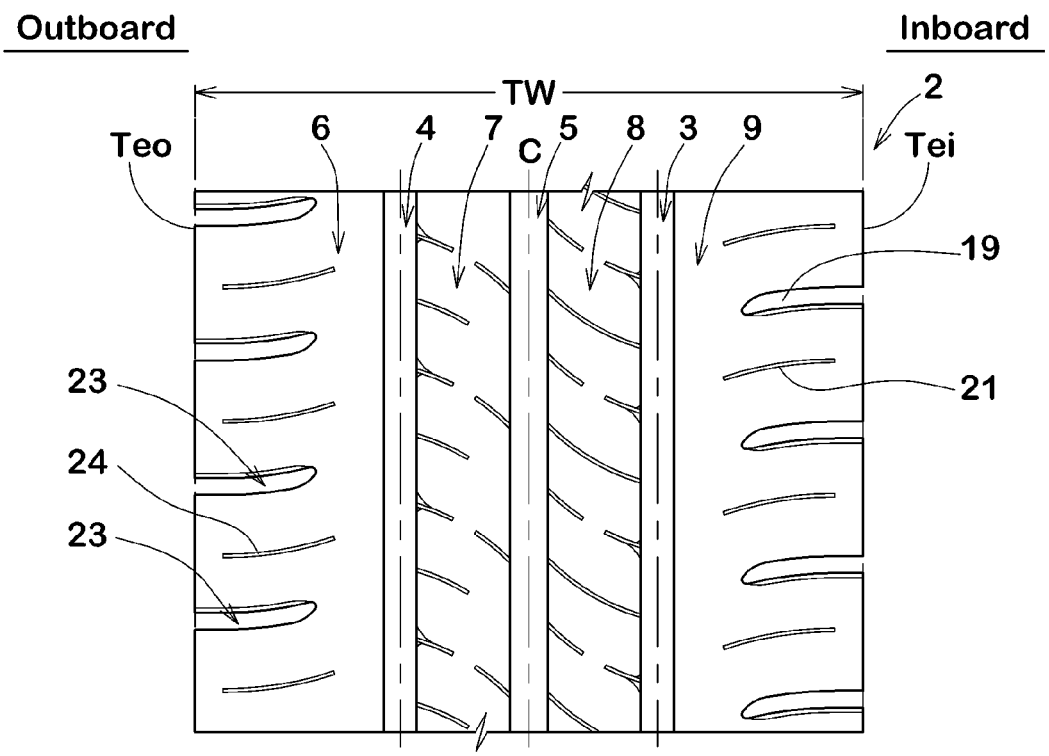
FIG. 7A is a development view of a tread portion in accordance with further embodiment of the present invention.
Figure 7B:
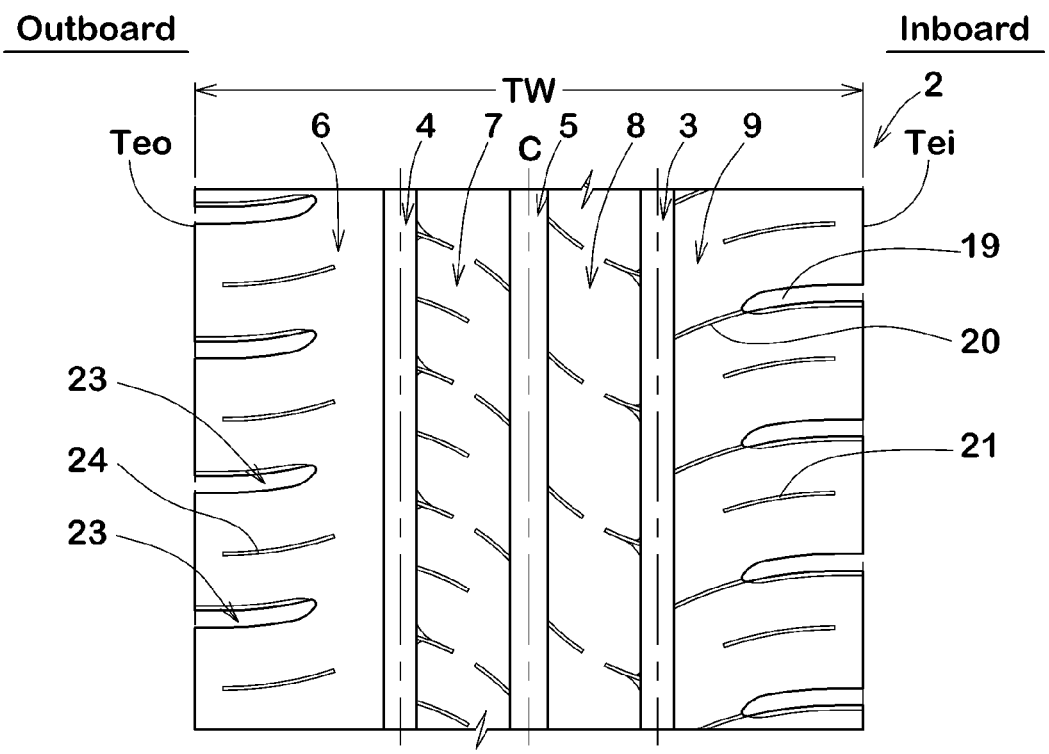
FIG. 7B is a development view of a tread portion in accordance with further reference.
Figure 8A:
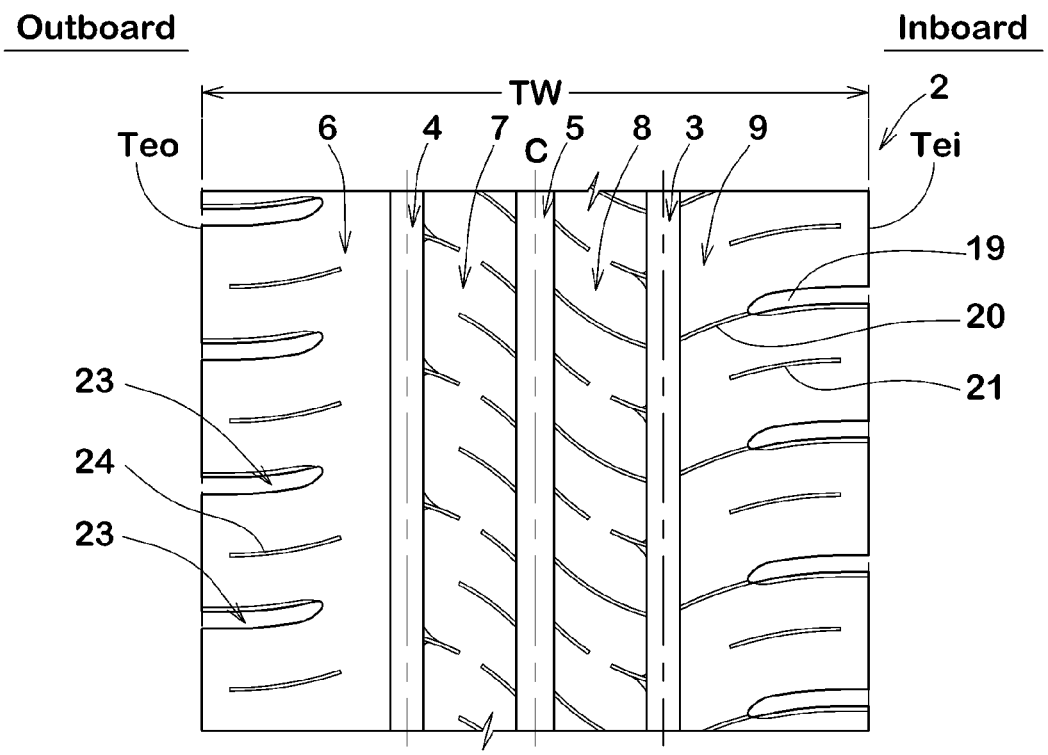
FIG. 8A is a development view of a tread portion in accordance with still further reference.
Figure 8B:
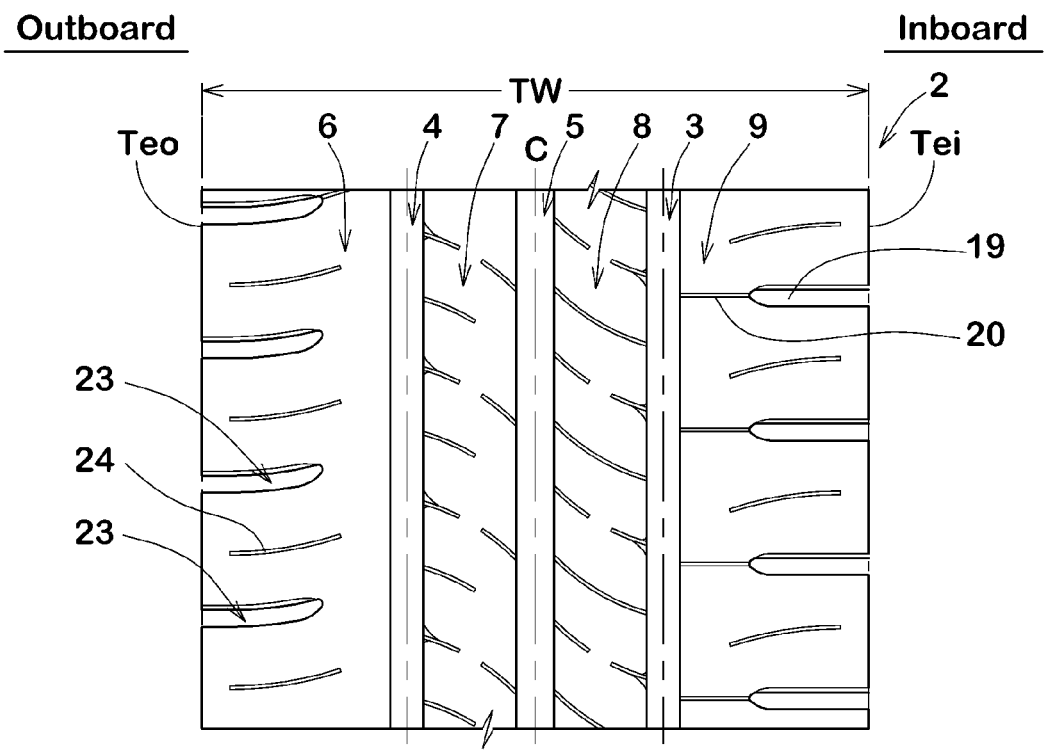
FIG. 8B is a development view of a tread portion in accordance with further embodiment of the present invention.
Figure 9A:
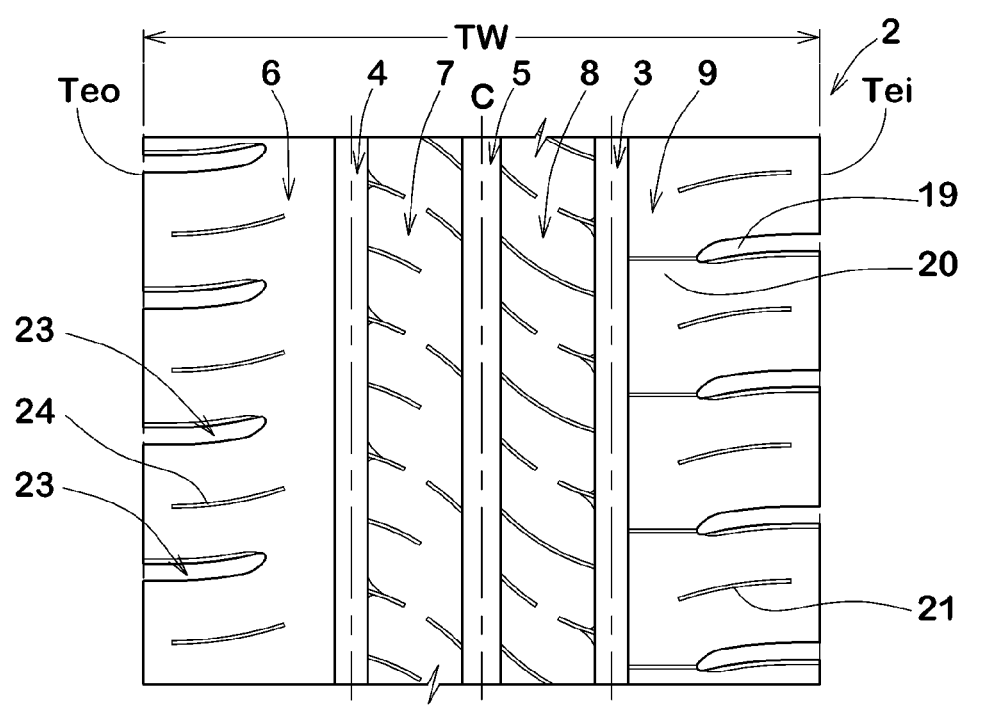
FIGS. 9A and 9B are development views of tread portions in accordance with still further embodiments of the present invention.
Figure 9B:
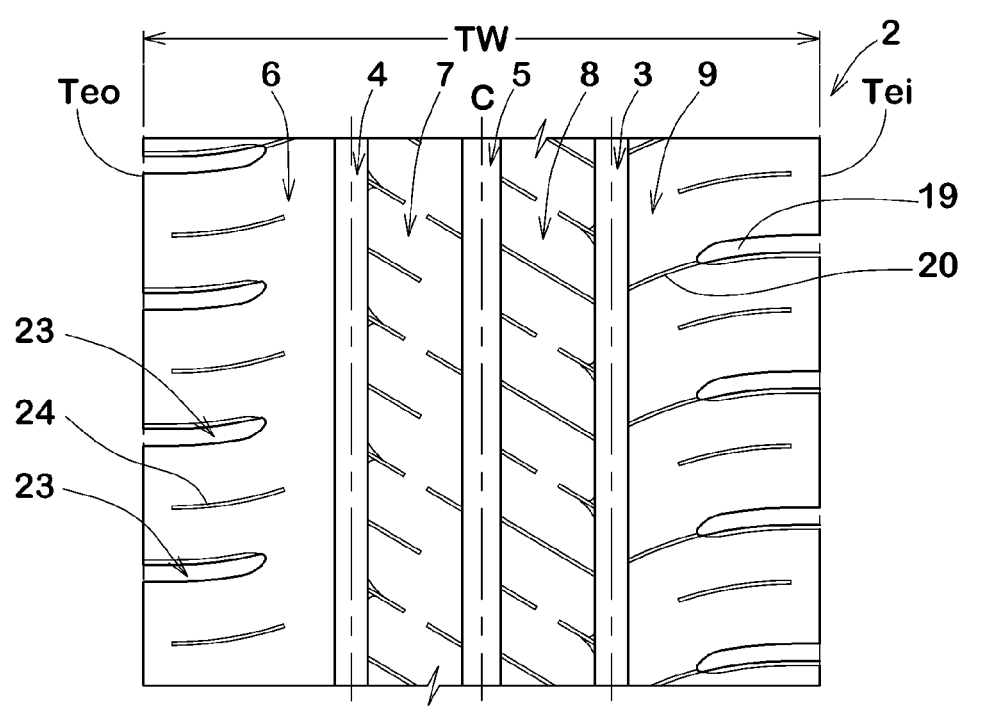
Figure 10A:
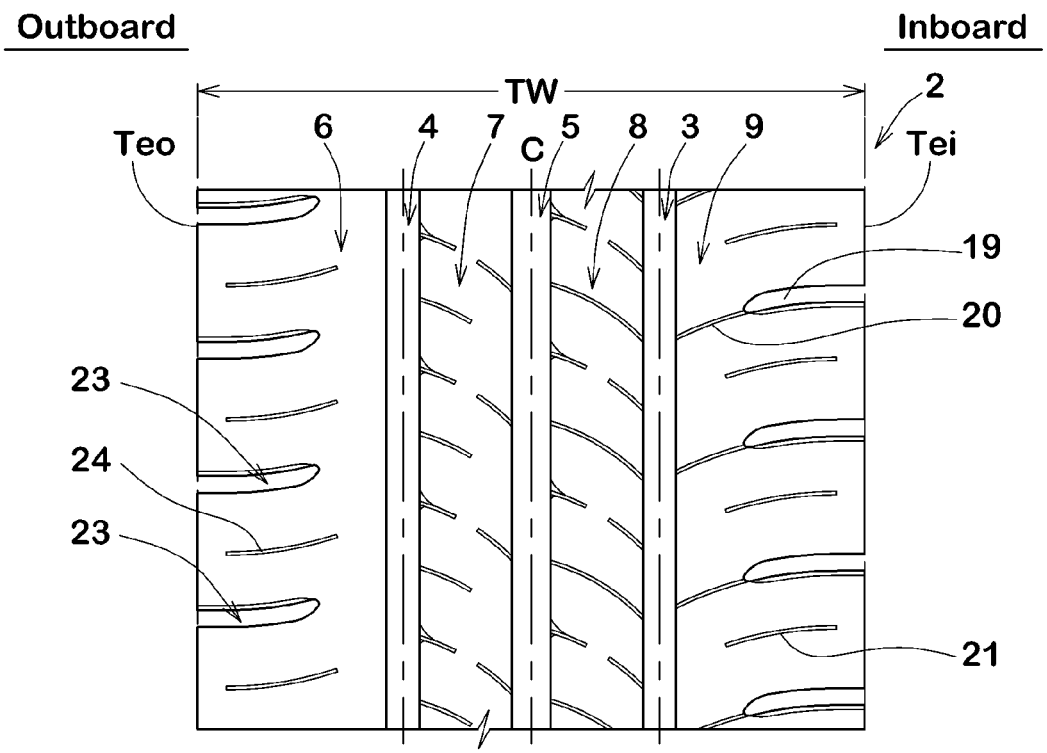
FIGS. 10A and 10B are development views of tread portions in accordance with still further embodiments of the present invention.
Figure 10B:
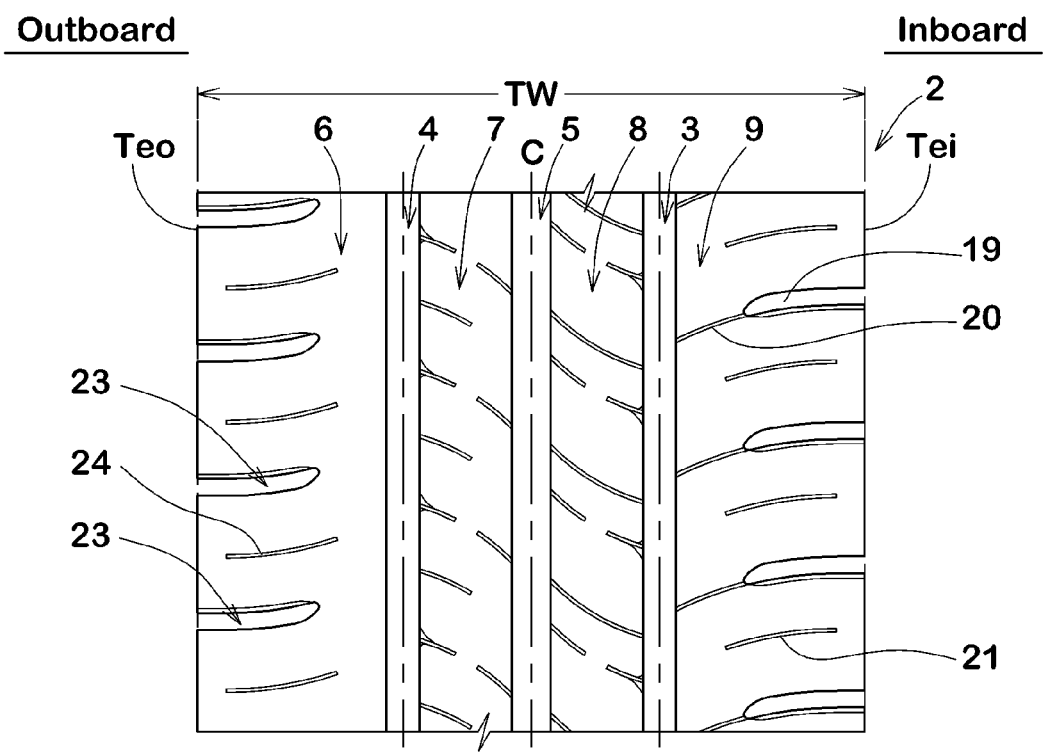

|  | Ex. 8 | Ref. 4 | Ex. 9 | Ref. 5 | Ref. 6 | Ex. 10 | Ex. 11 | Ex. 12 | Ex. 13 | Ex. 14 |
|---|---|---|---|---|---|---|---|---|---|---|
| Tread pattern | FIG. 6A | FIG. 6B | FIG. 7A | FIG. 7B | FIG. 8A | FIG. 8B | FIG. 9A | FIG. 9B | FIG. 10A | FIG. 10B |
| Inboard middle sipe width W4 (mm) | 0.6 | 0.6 | 0.6 | 0.6 | 0.6 | 0.6 | 0.6 | 0.6 | 0.6 | 0.6 |
| Outboard middle sipe width W5 (mm) | 0.6 | 0.6 | 0.6 | 0.6 | 0.6 | 0.6 | 0.6 | 0.6 | 0.6 | 0.6 |
| Ratio of number of inner sipe to number of outer sipe on outboard middle portion | 0.5 | 1 | 0.5 | 0.5 | 2 | 0.5 | 0.5 | 0.5 | 0.5 | 0.5 |
| Middle sipe radius of curvature R1, R2 (mm) | 43 | 43 | 43 | 43 | 43 | 43 | 43 | Infinite | 43 | 43 |
| Steering stability [Score] | 96 | 80 | 103 | 80 | 88 | 96 | 98 | 95 | 95 | 97 |
| Ride comfort [Score] | 102 | 110 | 94 | 90 | 100 | 101 | 100 | 100 | 100 | 98 |
| Wet braking performance [Index] | 100 | 100 | 100 | 100 | 100 | 98 | 100 | 100 | 100 | 100 |
| Noise performance [db (A)] | 73.7 | 73.8 | 74.6 | 74.6 | 74 | 74.7 | 74.1 | 74.2 | 74.1 | 74.1 |

Inboard and outboard shoulder lug groove depths: 5.8 mm
Inboard and outboard shoulder lug groove widths: 3.5 mm
Sipe depths on inboard and outboard middle portions: 3.5 mm
  Closed sipe depths: 3.5 mm
  Closed sipe widths: 0.6 mm Steering Stability and Ride Comfort Test:

The test tires were installed in a vehicle with a displacement of 1,200 cc as four wheels under the following conditions. Then, each five test drivers drove the test car on a test course having a dry asphalt surface, and evaluated steering stability such as initial responsiveness and steering effort, and ride comfort based on stiffness by each driver's feeling. The results are shown using a score based on Ex.1 being 100. The larger the value, the better the performance is.

From the test results, it was confirmed that example tires in accordance with the present invention offered improved steering stability, ride comfort, wet braking performance and noise performance as compared to references.

The invention claimed is:
1. A pneumatic tire comprising
a tread portion having a designated install direction to a vehicle to define an inboard tread edge and an outboard tread edge,
the tread portion provided with a plurality of circumferentially and continuously extending inboard shoulder main groove to be located in the most inboard, a circumferentially and continuously extending outboard shoulder main groove to be located in the most outboard and a circumferentially and continuously extending center main groove between the inboard shoulder main groove and the outboard shoulder groove, to form an outboard shoulder portion between the outboard shoulder main groove and an outboard tread edge, an inboard shoulder portion between the inboard shoulder main groove and an inboard tread edge, an inboard middle portion between the center main groove and the inboard shoulder main groove, and an outboard middle portion between the center main groove and the outboard shoulder main groove, each of said inboard middle portion and outboard middle portion forming a rib that is not provided with any groove having a groove width of not less than 2 mm but provided with only sipes having widths in a range of less than 2.0 mm, said sipes provided on the inboard middle portion including a full-opened sipe that has one end connected with the inboard shoulder main groove and the other end connected with the center main groove, said sipes provided on the outboard middle portion consisting of a plurality of outer semi-opened sipes and a plurality of inner semi-opened sipes, each said outer semi-opened sipe having one end connected with the outboard shoulder main groove and the other end terminating within the outboard middle portion, and each said inner semi-opened sipe having one end connected with the center main groove and the other end terminating within the outboard middle portion, wherein the number of said inner semi-opened sipes is smaller than the number of said outer semi-opened sipes.

2. The pneumatic tire according to claim 1,
wherein said outer semi-opened sipes on the outboard middle portion comprise a plurality of first outer semi-opened sipes and a plurality of second outer semi-opened sipes, wherein each first outer semi-opened sipe is provided on an extension line smoothly extending from one of said inner semi-opened sipes, and each second outer semi-opened sipe is provided between circumferentially adjacent said first outer semi-opened sipes.

3. The pneumatic tire according to claim 1,
wherein said sipes provided on said inboard middle portion further include a plurality of outer semi-opened sipes each having one end connected with the inboard shoulder main groove and the other end terminating within the inboard middle portion and a plurality of inner semi-opened sipes each having one end connected with the center main groove and the other end terminating within the inboard middle portion.

4. The pneumatic tire according to claim 3,
wherein said outer semi-opened sipes on said inboard middle portion consist of only first outer semi-opened sipes each of which is provided on an extension line smoothly extending of said each inner semi-opened sipe on the inboard middle portion.

5. The pneumatic tire according to claim 4,
wherein each said full-opened sipe is provided between adjacent first outer semi-opened sipes.

6. The tire according to claim 5,
wherein each said full-opened sipe is provided in a center region between adjacent first outer semi-opened sipes.

7. The pneumatic tire according to claim 1,
wherein said each sipe on the inboard middle portion extends in arc-shape having its center of radius of curvature located in a first side of the sipe with respect to a circumferential direction of the tire, and said each sipe on the outboard middle portion extends in arc-shape having its center of radius of curvature located in a second side of the sipe with respect to the circumferential direction of the tire, wherein the second side is opposite to the first side.

8. The pneumatic tire according to claim 1,
wherein said outboard shoulder portion is provided with a plurality of outboard shoulder lug grooves having groove widths in a range of not less than 2 mm, wherein each outboard shoulder lug groove extends from the outboard tread edge to its axially inner end terminating within the outboard shoulder portion, and the outboard shoulder portion is not provided with any grooves nor sipes connecting the outboard shoulder lug groove to the outboard shoulder groove;

said inboard shoulder portion is provided with a plurality of inboard shoulder lug grooves having groove widths in a range of not less than 2 mm, and a plurality of inboard shoulder sipes, wherein each inboard shoulder lug groove extends from the inboard tread edge to its axially inner edge to its axially inner end terminating within the inboard shoulder portion, and said inboard shoulder sipes each extending between the axially inner end of the inboard shoulder lug groove and the inboard shoulder main groove.

9. The pneumatic tire according to claim 8,
wherein each said inboard shoulder lug groove comprises an axially outer portion extending along an axial direction of the tire and an axially inner portion inclining with respect to the axial direction of the tire.

10. The tire according to claim 9,
wherein said inboard shoulder sipe is inclined in the same direction of the axially inner portion of the inboard shoulder lug groove.

* * * * *